(12) United States Patent
Shu et al.

(10) Patent No.: US 6,644,894 B2
(45) Date of Patent: Nov. 11, 2003

(54) PASSIVE APPARATUS AND METHOD FOR REDUCING FLUID INDUCED STRESSES BY INTRODUCTION OF ENERGETIC FLOW INTO BOUNDARY LAYER AROUND STRUCTURES

(75) Inventors: Hongbo Shu, Houston, TX (US); Donald Wayne Allen, Richmond, TX (US)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 09/773,766

(22) Filed: Jan. 31, 2001

(65) Prior Publication Data

US 2002/0066570 A1 Jun. 6, 2002

Related U.S. Application Data

(60) Provisional application No. 60/179,223, filed on Jan. 31, 2000.

(51) Int. Cl.⁷ .............................. B63B 1/34; E21B 17/01
(52) U.S. Cl. ............. 405/211; 405/195.1; 405/224.2; 166/367; 166/359; 114/243; 114/264; 114/67 A; 114/67 R
(58) Field of Search ........................ 166/350, 355, 166/359, 367; 405/195.1, 204, 205, 211, 223.1, 224, 224.2; 114/56.1, 67 A, 67 R, 243, 264, 265; 440/38

(56) References Cited

U.S. PATENT DOCUMENTS

| | | | | |
|---|---|---|---|---|
| 39,394 A | * | 8/1863 | Harris | 440/38 |
| 179,266 A | * | 6/1876 | Chapman | 440/38 |
| 1,818,705 A | * | 8/1931 | Gay | 440/38 |
| 2,663,276 A | * | 12/1953 | Ouellet | 114/67 A |
| 2,998,790 A | * | 9/1961 | Mason | 114/264 X |
| 3,342,032 A | * | 9/1967 | Cox et al. | 440/38 X |
| 3,628,488 A | * | 12/1971 | Gibson | 114/67 A |
| 3,710,748 A | * | 1/1973 | Baer et al. | 114/151 |
| 3,717,113 A | * | 2/1973 | Wilde | 114/264 |
| 4,078,605 A | * | 3/1978 | Jones | 166/359 |
| 4,286,434 A | * | 9/1981 | Moisdon | 60/641.7 |
| 4,656,959 A | * | 4/1987 | Moisdon | 114/56.1 |
| 5,875,728 A | * | 3/1999 | Ayers et al. | 114/264 |
| 5,984,584 A | * | 11/1999 | McMillan et al. | 405/195.1 |
| 6,148,751 A | * | 11/2000 | Brown et al. | 114/67 A |
| 6,196,768 B1 | * | 3/2001 | Allen et al. | 405/224 |
| 6,349,664 B1 | * | 2/2002 | Brown et al. | 114/264 |

FOREIGN PATENT DOCUMENTS

| | | | | |
|---|---|---|---|---|
| GB | 2053805 | * | 2/1981 | 440/38 |
| GB | 2310832 | * | 9/1997 | |
| WO | 9200221 | * | 1/1992 | 440/38 |

\* cited by examiner

*Primary Examiner*—Jong-Suk Lee
(74) *Attorney, Agent, or Firm*—Gilbrath & Associates, P.C.; J. M. (Mark) Gilbreth; Mary A. Gilbreth (57) ABSTRACT

The use of fluid passages for structures in fluid environments such as offshore platform risers or spars to reduce and/or control vortex-induced vibrations and drag is disclosed. The use of fluid passages to protect a moored marine vessel by reducing and/or controlling low frequency drift oscillations due to random waves, and low frequency wind induced resonant oscillations is also disclosed.

15 Claims, 6 Drawing Sheets

PASSIVE APPARATUS AND METHOD FOR REDUCING FLUID INDUCED STRESSES BY INTRODUCTION OF ENERGETIC FLOW INTO BOUNDARY LAYER AROUND STRUCTURES

RELATED APPLICATION DATA

This application claims priority from U.S. Provisional Application No. 60/179,223: Filed Jan. 31, 2000.

BACKGROUND OF THE INVENTION

1. Field of the Invention

The present invention relates to methods and apparatus of reducing and/or controlling vortex-induced vibrations ("VIV"), current drag, low frequency drift oscillations due to random waves, and low frequency wind induced resonant oscillations. In another aspect, the present invention relates to methods and use of passive apparatus for reducing and/or controlling VIV, current drag, low frequency drift oscillations due to random waves, and low frequency wind induced resonant oscillations. In even another aspect, the present invention relates to methods and use of flow thru members with marine members for reducing and/or controlling VIV, current drag, low frequency drift oscillations due to random waves, and low frequency wind induced resonant oscillations.

2. Description of the Related Art

When drilling for and/or producing hydrocarbons or the like from subterranean deposits which lie under a body of water, it is necessary to provide a marine riser system for establishing fluid communication between the water surface and the marine bottom. The principal purpose of the riser is to provide a fluid flow path between a drilling vessel and a well bore and to guide a drill string to the well bore.

A typical marine riser system normally consists of one or more fluid-conducting conduits which extend from the water surface to a structure (e.g., wellhead) on the marine bottom. For example, in drilling a submerged well, a drilling riser usually consists of a main conduit through which the drill string is lowered and through which the drilling mud is circulated from the lower end of the drill string back to the surface. In addition to the main conduit, it is conventional to provide auxiliary conduits, e.g., choke and kill lines, etc., which extend parallel to and are carried by the main conduit.

This drilling for and/or producing of hydrocarbons from offshore fields has created many unique engineering challenges. For example, in order to limit the angular deflections of the upper and lower ends of the riser pipe and to provide required resistance to lateral forces, it is common practice to use apparatus for adding axial tension to the riser pipe string. Further complexities are added when the drilling structure is a floating vessel, as the tensioning apparatus must accommodate considerable heave due to wave action. Still further, the lateral forces due to current drag require some means for resisting them whether the drilling structure is a floating vessel or a platform fixed to the subsurface level.

The magnitude of the stresses on the riser pipe are generally a function of and increase with the velocity of the water current passing the riser pipe, and the length of the riser pipe.

It is noted that even moderate velocity water currents acting on a riser can cause stresses. Such moderate or higher currents are readily encountered when drilling for offshore oil and gas in a marine inlet or near a river mouth.

Drilling in ever deeper water depths requires longer riser pipe strings which are subject to greater drag forces which must be resisted by more tension. This is believed to occur as the resistance to lateral forces due to the bending stresses in the riser decreases as the depth of the body of water increases. Accordingly, the adverse effects of drag forces against the riser caused by strong and shifting currents in these deeper waters increase and set up stresses in the riser which can lead to severe fatigue and/or failure of the riser if left unchecked.

There are generally two kinds of water current induced stresses.

The first kind of stress is caused by vortex-induced alternating forces that vibrate the riser ("vortex-induced vibrations" or "VIV") in a direction perpendicular to the direction of the current. When water flows past the riser, vortices are alternately shed from each side of the riser. This produces a fluctuating force on the riser transverse to the current. If the frequency of this harmonic load is near the resonant frequency of the riser, large vibrations transverse to the current can occur. These vibrations can, depending on the stiffness and the strength of the riser and the welds between the riser joint, lead to unacceptably short fatigue lives. In fact, stresses caused by high current conditions have been known to cause risers to break apart and fall to the ocean floor.

The second type of stress is caused by drag forces which push the riser in the direction of the current due to the riser's resistance to fluid flow. The drag forces are amplified by vortex induced vibrations of the riser. A riser pipe that is vibrating due to vortex shedding will disrupt the flow of water around it more than a stationary riser. This results in more energy transfer from the current to the riser, and hence more drag.

Many methods have been developed to reduce vibrations of subsea risers.

Some of these methods to reduce vibrations caused by vortex shedding from subsea risers operate by stabilization of the wake. These methods include streamlined fairings, wake splitters and flags.

Streamlined, or teardrop-shaped fairings that swivel around a riser have been developed that almost eliminate the sheading or vortices. The major drawbacks to teardrop shaped fairings is the cost of the fairing and the time required to install such fairings. Additionally, the critically-required rotation of the fairing around the riser is challenged by long-term operation in the undersea environment. A non-rotating fairing subjected to a cross-current may result in vortex shedding that induces greater vibration than the bare riser would incur.

Wake splitters are flat plates that extend drom the back of a riser parallel to the current flow direction. These wake splitters have been found to be effective to create a symmetric vortex pattern so that each vortex "sees" an image created by the rigid splitter plate giving symmetry with respect to the axis in the direction of flow. Splitter plates also stabilize the separation points, decrease the wake width and reduce drag. Splitter plates suffer from most of the same detrimental effects as teardrop shaped fairings for off-axis currents. They must therefore either be rotatable or be used only where the directions of a significant current does not vary.

Flags are similar to wake splitters, but are flexible. They are not generally as effective as wake splitters, but have the advantage that they can wrap around a riser and remain somewhat effective with varying current directions without being rotatable. Flags are not commonly used in subsea applications due to the high probability of the flag wrapping itself around the riser and becoming ineffective, and because of the difficulty and expense of attaching the flag to the riser along the length of the riser.

Other of these methods to reduce vibrations caused by vortex shedding from subsea risers operate by modifying the boundary layer of the flow around the riser to prevent the correlation of vortex shedding along the length of the riser. Examples of such methods include the inclusion of helical strakes around the riser, axial rod shrouds and perforated shrouds.

Where possible, it is generally preferred to utilize strakes over fairings, wake splitters and flags.

There exists a need in the art for methods and apparatus of reducing and/or controlling VIV, current drag, low frequency drift oscillations due to random waves, and low frequency wind induced resonant oscillations.

There is another need in the art for methods and apparatus of reducing and/or controlling VIV, current drag low frequency drift oscillations due to random waves, and low frequency wind induced resonant oscillations that do not suffer from the disadvantages of the prior art.

There is even another need in the art for methods and apparatus that act passively to reduce and/or control VIV, current drag, low frequency drift oscillations due to random waves, and low frequency wind induced resonant oscillations.

There is still another need in the art for methods and apparatus that use fluid passages passing thru marine members to reduce and/or control VIV, current drag, low frequency drift oscillations due to random waves, and low frequency wind induced resonant oscillations.

SUMMARY OF THE INVENTION

It is an object of the present invention to provide for methods and apparatus of reducing and/or controlling VIV, current drag, low frequency drift oscillations due to random waves, and low frequency wind induced resonant oscillations.

It is another object of the present invention to provide for methods and apparatus of reducing and/or controlling VIV, current drag, low frequency drift oscillations due to random waves, and low frequency wind induced resonant oscillations that do not suffer from the disadvantages of the prior art.

It is even another object of the present invention to provide for methods and apparatus that act passively to reduce and/or control VIV, current drag, low frequency drift oscillations due to random waves, and low frequency wind induced resonant oscillations.

It is still another object of the present invention to provide for methods and apparatus that use fluid passages passing thru marine members to reduce and/or control VIV, current drag, low frequency drift oscillations due to random waves, and low frequency wind induced resonant oscillations.

According to one embodiment of the present invention there is provided a method for protecting a first member from the effects of a current flowing past the member, the current defining a fluid boundary layer comprising an upstream region and downstream region near the member. The method comprises providing a fluid passage thru the member with an inlet positioned in the upstream region, and an outlet positioned in the downstream region.

According to another embodiment of the present invention provides a method for protecting a member from the effects of a current flowing past that structure. The method uses a fluid passage, with an inlet and an outlet, which extends from the upstream region to the downstream region of the structure. The method involves orienting the member to position the inlet in the upstream region, and to position the outlet in the downstream region.

According to even another embodiment of the present invention, a method is provided for reducing low frequency oscillations of a moored marine vessel caused by waves or wind striking the vessel. The method involves a vessel which has a first side and a second side, and where the oscillations of the vessel define an oscillating current flowing past the vessel. The method involves providing a fluid passage extending from the first side to the second side with a first opening positioned on the first side and a second opening positioned on the second side, wherein either opening is suitable for receiving the current when the vessel moves toward said opening and either opening is suitable for discharging the current when the vessel moves away from said opening.

According to yet another embodiment of the present invention a method is provided for reducing low frequency oscillations of a moored marine vessel caused by waves or wind striking the vessel, wherein the vessel has a first side and a second side, wherein the oscillations of the vessel define an oscillating current flowing past the vessel, and wherein the vessel defines a fluid passage with a first opening positioned on the first side and a second opening positioned on the second side. The method comprises orienting the vessel to allow either opening to receive current when the vessel moves toward said opening and to allow either opening to discharge the current when the vessel moves away from said opening.

According to even yet another embodiment of the present invention, there is provided an apparatus having resistance to the effects of a current flowing past the member, the current defining a fluid boundary layer comprising an upstream region and downstream region near the member. The apparatus comprises a member defining a fluid passage thru the member with an inlet positioned in the upstream region, an outlet positioned in the downstream region; and a valve positioned to affect the flow of current thru the passage.

DETAILED DESCRIPTION OF THE INVENTION

Figure 9:
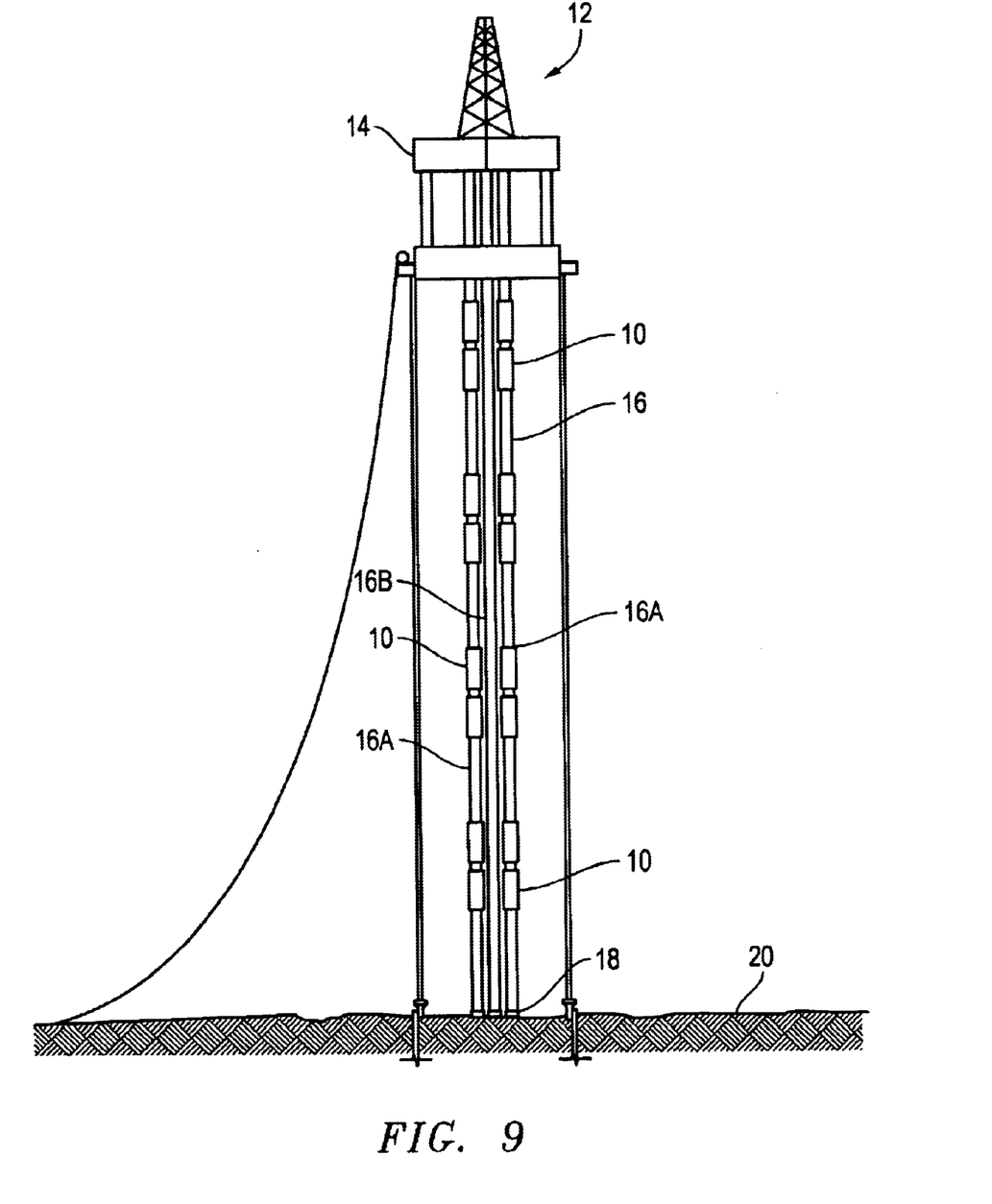
FIG. 9 is an illustration of a typical environment in which strake system 100 of present invention may be deployed, showing tension leg platform ("TLP") 12, risers 16, such as production risers 16A, drilling risers 16B and catenary risers 16C, surface facilities 14, and the ocean floor 20.

Referring first to FIG. 9, there is illustrated a typical environment in which pass through system 100 of the present invention may be deployed. An offshore platform 12, shown here a tension leg platform ("TLP"), includes surface facilities 14, risers 16, including production risers 16A, drilling risers 16B, and catenary risers 16C, and wells 18 at ocean floor 20. In some deepwater developments, it would not be uncommon for this to be a half mile or more of water depth. As the production risers are not tied to supporting framework such as the conductor guides in traditional bottom-founded platforms, buoyancy cans or floatation modules may be deployed along the length of the riser to increase its buoyancy, but horizontal or lateral loading from currents on this long, unsupported run is not alleviated by the addition of such buoyant support. Rather, the presence of buoyancy cans or floatation modules around the circumference of the risers materially increase the profile presented to the current and leads to greater drag and VIV effects. As discussed in the background, unabated, VIV can lead to premature failure of equipment. However, system 100 of the present invention is installed along production risers 16 to manage VIV problems.

As explained above, as water flows past the riser, vortices are alternately shed from each side of the riser in a fluid boundary layer region. The idea of the present invention, is to introduce flow from upstream into the fluid boundary layer, thereby reducing drag and vibration.

Figure 1:
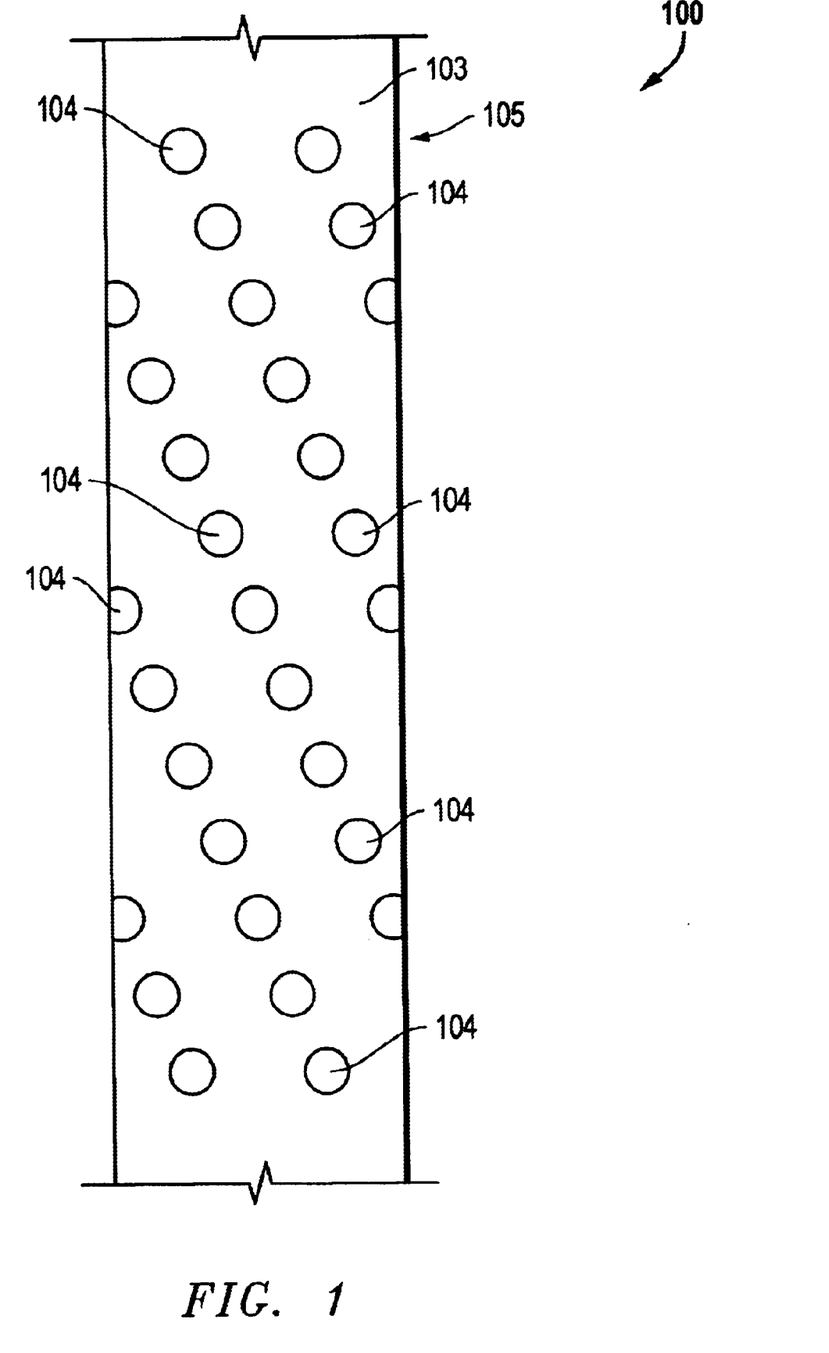
FIGS. 1 and 2 are respectively side and cross-sectional views of a riser pipe 105 having buoyancy member 103, and a multiplicity of fluid passage members 104 (note that for illustration purposes, only two representative fluid passage members 104 are shown in FIG. 2)
Figure 2:
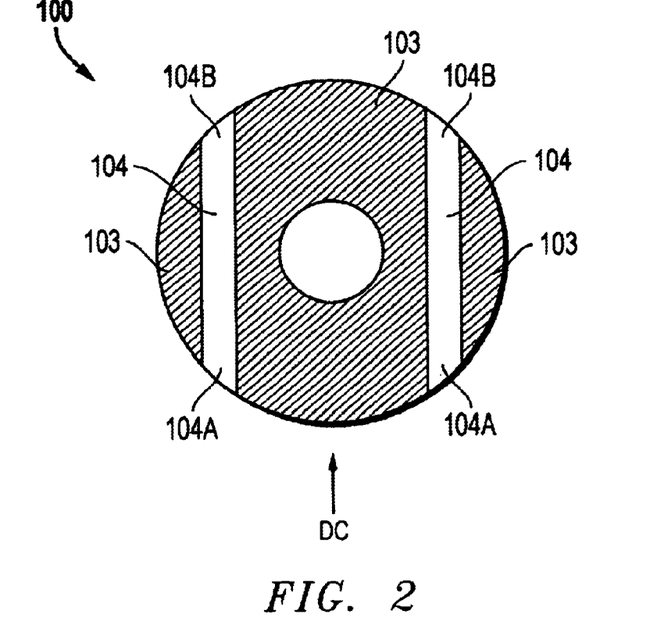

The present invention will now be described by reference to the figures. Referring first to FIGS. 1 and 2, there are respectively shown a side view and cross-sectional view of a riser pipe 105 having buoyancy member 103, and a multiplicity of fluid passage members 104 (note that for illustration purposes, only two representative fluid passage members 104 are shown in FIG. 2).

As shown in FIG. 2, the direction of current flow is indicated by arrow $D_c$, the upstream region is indicated generally at U, and the downstream region is indicated generally at D. Generally, each of fluid passage member 104 has a first opening 104A in upstream region U, and a downstream opening 104B in downstream region D.

Flow is created through fluid passage members 104 by a difference in pressure between the higher pressured inlet and the lower pressured outlet, due to the upstream/downstream positioning of the inlet and outlet of fluid passage member 104.

Fluid passage members 104 may be any suitable cross-sectional shape, including that of any regular or irregular polygon, and including that formed by any curvilinear shape. Non-limiting examples of suitable cross-sectional shapes for fluid passage members 104 include triangular, square, pentagonal, hexagonal, octagonal, circular, oval, and the like. The only limitations on the cross-sectional shape is that they provide a suitable flow channel and not unduly add to flow draw or vibration, and optimally provide some reduction in the flow drag or vibration.

While fluid passage members 104 are shown in FIGS. 1 and 2 as being within buoyancy member 103, it should be understood that fluid passage members may also be within by riser pipe 105. However, it is probably more convenient to place fluid passage members 104 within buoyancy member 103, and certainly more convenient if fluid passage members 104 are being retrofit to an existing riser 105.

Figure 3:
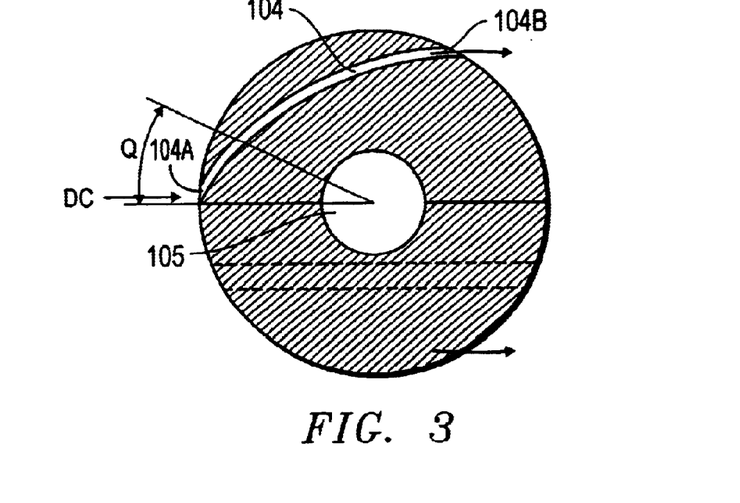
FIG. 3 is a cross-sectional view of riser pipe 105, having buoyancy member 103, through which passes flow thru member 104, not oriented in the direction of flow $D_c$.

While fluid passage members 104 are shown in FIGS. 1 and 2 as being oriented along the direction of flow $D_c$, they may also be oriented differently to the direction of flow $D_c$. Referring now to FIG. 3 there is shown a cross-section of riser pipe 105, having buoyancy member 103, through which passes fluid passage member 104, not oriented in the direction of flow $D_c$. As shown in FIG. 3, the outlet 104B of flow thru member 104 is oriented at least 30° around from inlet 104A.

While fluid passage members 104 are shown in FIGS. 1 and 2 as being within and integral to buoyancy member 103, or discussed as being within and integral to riser 105, it must be understood that fluid passage members 104 may also be positioned on the outside and distinct from buoyancy member 103 or riser 105.

Figure 4:
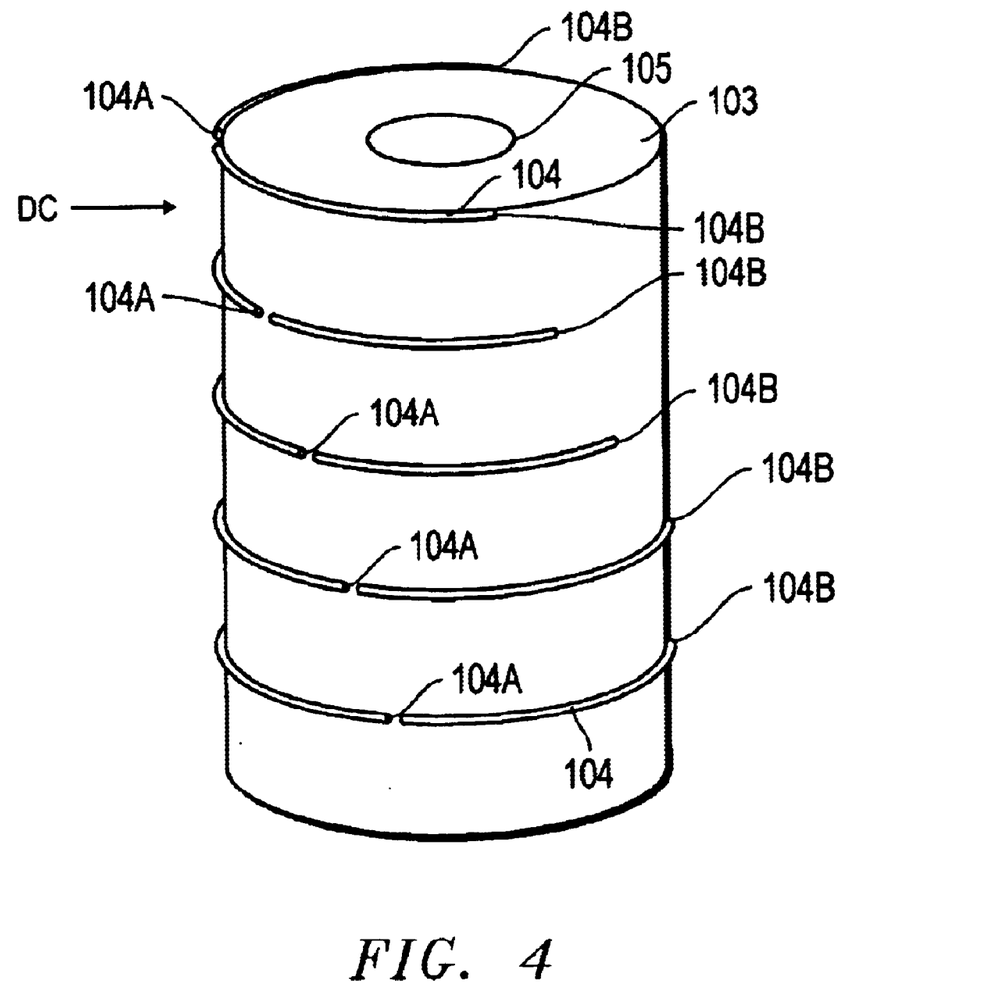
FIG. 4, is an illustration showing a multiplicity of fluid passage members 104 positioned on the outside of buoyancy member 103.

Referring now to FIG. 4, there is shown a multiplicity of fluid passage members 104 positioned on the outside of buoyancy member 103, being distinct and not integral to buoyancy member 103. This embodiment finds easy utility not only for original manufacturers, but also for retrofit circumstances. Notice also, that the various outlets 104B may be oriented in a staggered helical pattern relative to each other (or any other suitable pattern for that matter), as can the various inlets 104A relative to each other. In this embodiment, fluid passage members 104 are affixed to buoyancy members 103 by any suitable means, including welding, clipping, clamping, bracketing, bolting, or with the use of a polymeric or other adhesive bonding agent.

Figure 5:
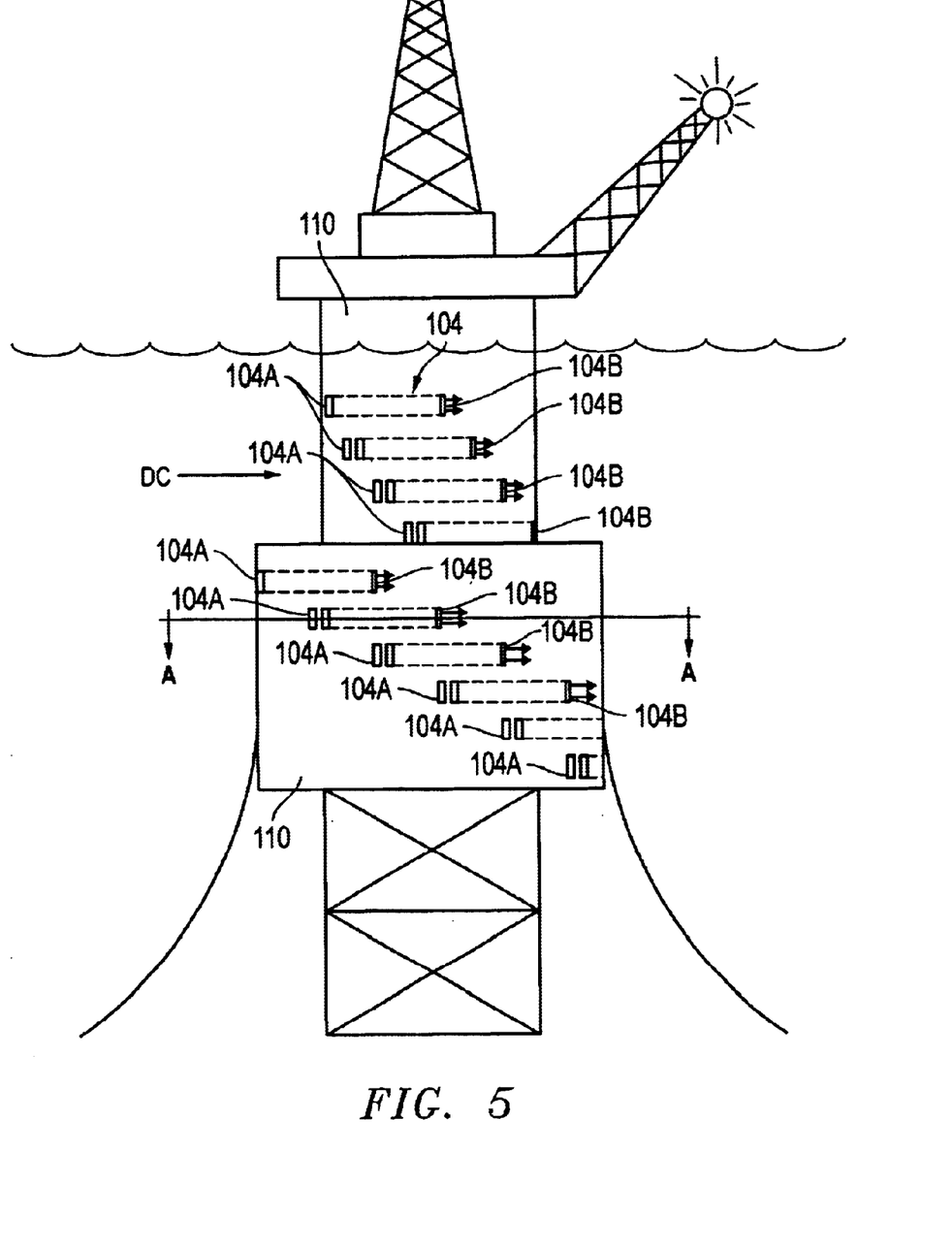
FIGS. 5 and 6, are respectively side and cross-sectional views of a spar 110, showing fluid passage members 104.
Figure 6:
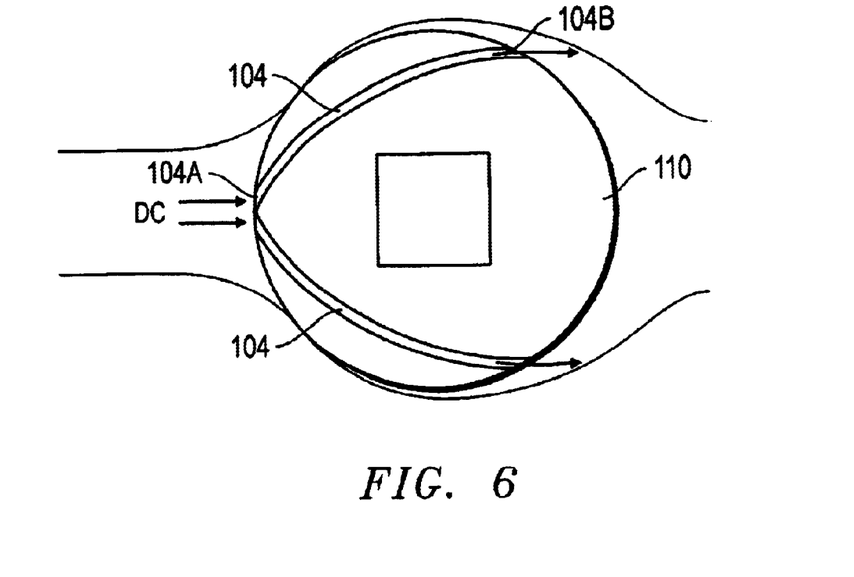

Referring now to FIGS. 5 and 6, there is shown respectively, a side view and a cross-sectional top view of a spar 110, showing fluid passage members 104.

Figure 7:
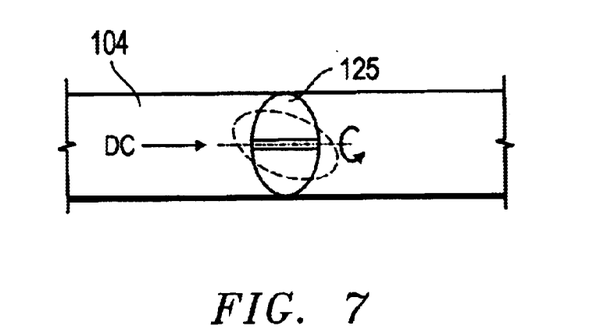
FIGS. 7 and 8 are respectively, fluid passage member 104 having a valve 125 in an open and shut position.
Figure 8:
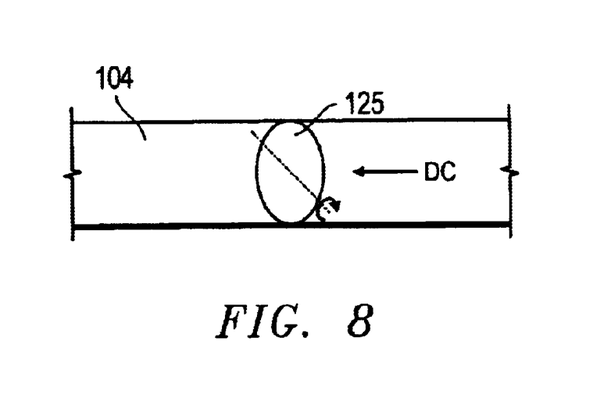

Referring now to FIGS. 7 and 8, there are shown respectively, fluid passage member 104 having a valve 125 in an open and shut position. These valves 125 can be used to affect or control flow direction, by preventing reverse flow. Also, valves 125 may affect or regulate flow thru fluid passage member 104 by controlling the flow at any percentage of flow ranging between 0% and 100% of the possible flow rate. Additionally, where a multiplicity of fluid passage members 104 each having a valve 125 are being utilized, selective opening or shutting of valves can vary the control on the fluid boundary layer. When utilized in such a control scheme, valves 125 may be manually operated and/or may be automated and connected to a controller.

While the present invention has been illustrated mainly by reference to a TLP and a spar, it should be understood that the present invention is not to be so limited and finds utility in a wide variety of applications, including but not limited to ship hulls, risers and columns of semi-submersibles, Floating Production, Storage and Offshore Loading vessels (FPSO'S), and the like.

Furthermore, while the present invention has been illustrated mainly by reference to a marine environment, non-limiting examples of which include fresh and saltwater and flowing and non-flowing bodies of water such as oceans, seas, gulfs, rivers, lakes, lochs, streams, ponds, or estuaries. It should be understood that the present invention is not to be so limited and finds utility in a wide variety of other fluid environments, including air or other gases.

Regarding materials of construction, fluid passage members 104 may be constructed of any materials suitable for the underwater environment and suitable for supporting the strakes. Additionally, it may be desirable in some instances for fluid passage members 104 to provide buoyancy and/or insulation.

Finally, the passive apparatus and methods of the present invention may be utilized in any combination with the active methods and apparatus as disclosed in Provisional Patent Application entitled "Active Apparatus and Method for Reducing Fluid Induced Stresses by Introduction of Energetic Flow into Boundary Layer Around Offshore Platform Riser", by inventors Hongbo Xu and Donald Wayne Allen, filed on Jan. 31, 2000 as U.S. Provisional patent application Ser. No. 60/179222 (further identified by attorney docket No. 26780/07), and as disclosed in U.S. patent application entitled "Active Apparatus and Method for Reducing Fluid Induced Stresses by Introduction of Energetic Flow into Boundary Layer Around Structures" by inventors, Hongbo Shu and Donald Wayne Allen, filed on even date herewith under Express Mail No. EL 855 100 835, of which applications are herein incorporated by reference.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A method for protecting a first member from the effects of a fluid current flowing past the member, the current defining a fluid boundary layer comprising an upstream region and downstream region near the member, the method comprising:

(a) forming a first member fluid passage having a first opening positioned in the upstream region and a second opening positioned in the downstream region, wherein said downstream region is subject to vortex shedding caused by said current, wherein fluid flows passively through said fluid passage, is free of mechanical propulsion, and disrupts said vortex shedding.

2. The method of claim 1 further comprising:

(b) selectively opening and closing the fluid passage.

3. The method of claim 1, wherein the first member is an offshore marine member.

4. The method of claim 1, wherein the fluid passage is formed thru the first member.

5. The method of claim 1, wherein the fluid passage is formed thru a fluid passage member, wherein the fluid passage member is supported by the first member.

6. The method of claim 5, wherein the fluid passage member is an integral part of the first member.

7. The method of claim 5, wherein the fluid passage member is distinct from the first member.

8. A method for protecting a member from the effects of a fluid current flowing past said member, wherein a fluid passage having a first opening and a second opening is defined in or on the member, wherein the current defines an upstream region and downstream region near the member, the method comprising:

(a) orienting the member to position the first opening in the upstream region, and to position the second opening in the downstream region, wherein said downstream region is subject to vortex shedding caused by said current, wherein fluid flows passively through said fluid passage, is free of mechanical propulsion, and disrupts said vortex shedding.

9. The method of claim 8 further comprising:

(b) selectively opening and closing the fluid passage.

10. The method of claim 8, wherein the member is an offshore marine member.

11. A method for reducing low frequency oscillations of a moored marine vessel caused by waves or wind striking the vessel, wherein the vessel has a first side and a second side, and wherein the oscillations of the vessel define an oscillating current flowing past the vessel, the method comprising:

(a) providing a fluid passage extending from the first side to the second side with a first opening positioned on the first side and a second opening positioned on the second side, wherein one of said sides is upstream relative to said current and the other side is downstream relative to said current, and wherein said upstream and downstream sides are dependent on the direction of said current flow, wherein said downstream side comprises a region subject to vortex shedding caused by said current, wherein either opening is suitable for functioning as an entrance for receiving the current when the vessel moves toward said current and either opening is suitable for functioning as an exit for discharging the current when the vessel moves away from said current and wherein fluid flows through said fluid passage passively, and is free of mechanical propulsion, and disrupts said vortex shedding.

12. A method for reducing low frequency oscillations of a moored marine vessel caused by waves or wind striking the vessel, wherein the vessel has a first side and a second side, wherein the oscillations of the vessel define an oscillating current flowing past the vessel, and wherein a fluid passage is defined in or on the vessel with a first opening positioned on the first side and a second opening positioned on the second side, wherein one of said sides is upstream relative to said current and the other side is downstream relative to said current, and wherein said upstream and downstream sides are dependent on the direction of said current flow, wherein said downstream side comprises a region subject to vortex shedding caused by said current, the method comprising:

(a) orienting the vessel to allow either opening to receive current when the vessel moves toward said current and to allow either opening to discharge the current when the vessel moves away from said current, and wherein fluid flows through said fluid passage passively, is free of mechanical propulsion, and disrupts said vortex shedding.

13. An apparatus having resistance to the effects of a fluid current flowing past the apparatus, the current defining a fluid boundary layer comprising an upstream region and downstream region near the apparatus, the apparatus comprising:

(a) a member defining a fluid passage thru said member with an inlet positioned in the upstream region, and an outlet positioned in the downstream region; wherein said downstream region is subject to vortex shedding caused by said current, and (b) a valve positioned to affect the flow of current thru the passage wherein fluid flows passively through said fluid passage free from mechanical propulsion, and disrupts said vortex shedding.

14. The apparatus of claim 13, wherein the valve prevents fluid flow from the outlet to the inlet.

15. The apparatus of claim 13, wherein the member is an offshore marine member.

* * * * *